July 30, 1940.  A. J. McGANN  2,209,701
DEVICE FOR CUTTING OR SCORING NECKS OF BOTTLES
Filed March 8, 1938
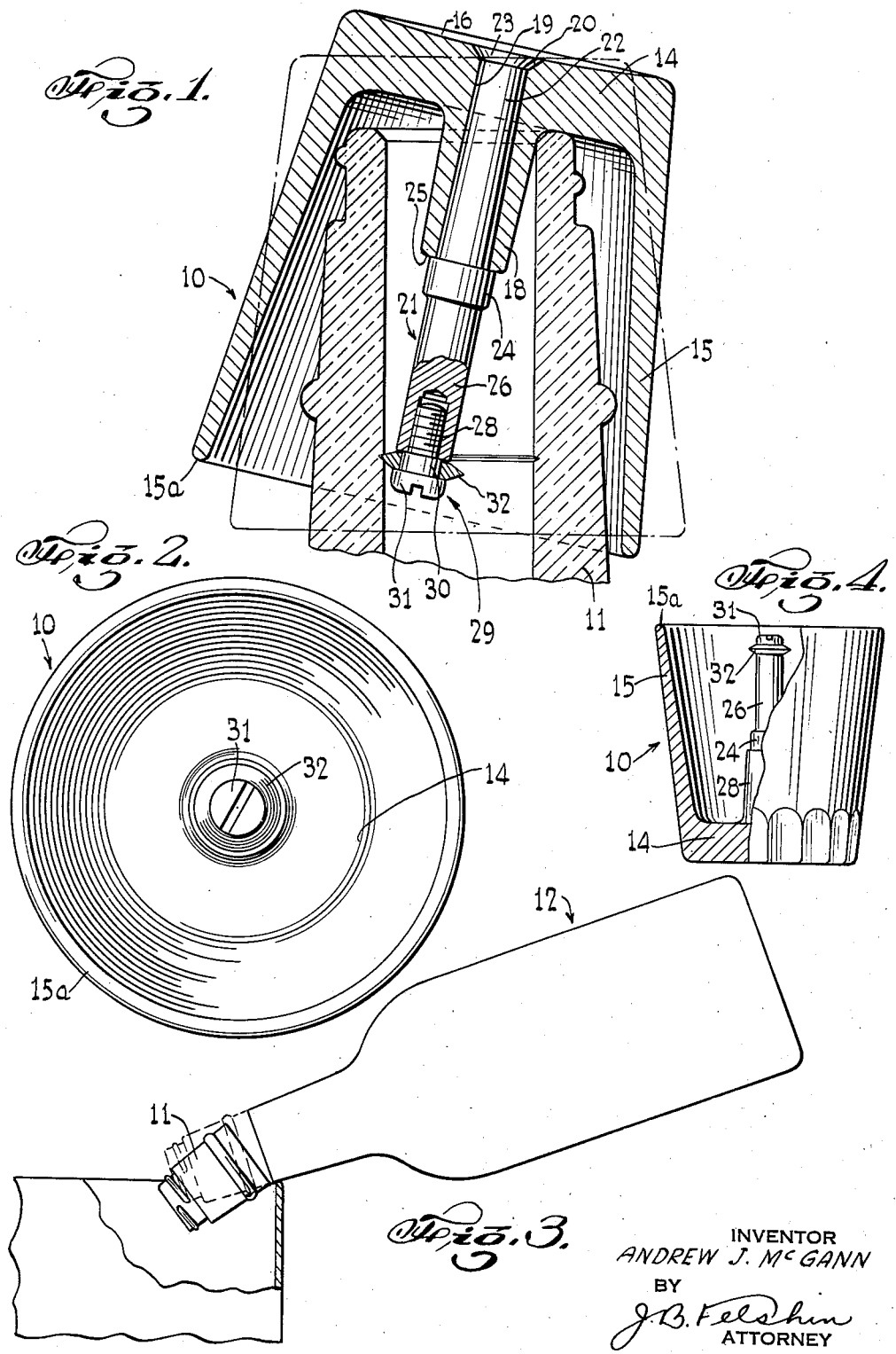
INVENTOR
ANDREW J. McGANN
BY
J. B. Felshin
ATTORNEY Patented July 30, 1940

2,209,701

UNITED STATES PATENT OFFICE 2,209,701

DEVICE FOR CUTTING OR SCORING NECKS OF BOTTLES

Andrew J. McGann, New York, N. Y.

Application March 8, 1938, Serial No. 194,640

7 Claims. (Cl. 49—52)

This invention relates to devices for cutting or scoring necks of bottles. It is particularly directed to a device for scoring the inside of the neck of a bottle, whereby the neck may be easily knocked off by striking the scored neck against some object without danger of spray of shattered glass.

An object of this invention is to provide an article of the character described, which shall have the shape and appearance of a whiskey or cocktail glass, and which may be conveniently held in the hand and operated to score the bottle neck.

Another object of this invention is to provide a compact, strong and durable device of the character described, which shall be relatively inexpensive to manufacture, easy to assemble and operate, attractive in appearance, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is an elevational, cross-sectional view of the bottle neck cutter embodying the invention, in position for scoring the inside of the neck of a bottle;

Fig. 2 is a top plan view of my improved cutter;

Fig. 3 is a side, elevational view illustrating the manner of knocking off the bottle neck after scoring the inside thereof; and Fig. 4 is a front, elevational view of my improved device with parts in cross-section.

Referring now in detail to the drawing, 10 designates a bottle neck scoring or cutting device embodying the invention, and shown in Fig. 1 in position for scoring or cutting the inner surface of neck 11 of a bottle 12.

The device 10 may be in the shape of a whiskey or cocktail glass, so that the same may be placed at the bar and having a neat appearance, and the outer surface thereof may contain advertising matter.

To this end, the device 10 is provided with a circular bottom wall 14, and an upstanding, upwardly and outwardly inclined annular wall 15, preferably increasing in thickness toward the bottom. The undersurface of the bottom wall 14 may be somewhat concave, as at 16. Said bottom wall may be provided with an axial boss 18 projecting upwardly and formed with an axial through opening 19. Said opening 19 is preferably tapered, decreasing in diameter toward the bottom. The bottom end of the through opening 19 is countersunk however, as at 20, for the purpose hereinafter appearing.

Mounted within the opening 19 is an axial stem 21. Said stem has a tapered portion 22 disposed within said opening 19. The lower end of the tapered portion 22 is riveted over, as at 23, within the counter sunk opening 20.

Extending from the tapered portion 22 of stem 21, is a collar 24, contacting the upper edge 25 of boss 18. Extending upwardly from the collar 24 is a cylindrical portion 26 terminating short of the upper rim edge 15a of wall 15.

The upper end of member 21 is formed with an axial screw threaded opening 28. Screwed within said opening 28 is a screw 29, having an enlarged shoulder or collar portion 30, contacting the upper end of the stem 21; and a head 31, spaced from said upper end. Received on the collar 30, and retained against the upper end of the stem 21 by the head 31 of the screw 29, is an annular glass cutter 32 made of hard steel or any other suitable substance and having an outer annular cutting edge.

As shown in the drawing, the boss 18 projects upwardly in the glass shaped member 10 about ⅓ of the vertical distance, and the stem 21, cutter 32 and screw 29 are all disposed somewhat below the upper rim edge 15a of the annular wall 15, so as not to project thereabove.

The diameter of boss 18 and stem 21 is such as to permit the same to readily enter the neck of a usual liquor bottle, and allow the bottle to be tilted to engage the cutter 32 with the inner surface of the bottle.

The operation of the device for cutting or scoring the neck of a bottle will now be described:

The device 10 is inverted and stem 21 and boss 18 inserted into the neck of the bottle. The device 10 is then tilted relative to the bottle, to bring the cutter against the inner surface of the neck of the bottle. The member 10 may be held conveniently in the hand and rotated to score or cut all around the inside of the neck of the bottle. Either device 10 or the bottle may be rotated to score the neck. The device 10 may then be removed and the upper end of the bottle struck on any object to cleanly knock off a portion of the neck above the line of scoring, without danger of flying shattered glass.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. A hand device for scoring the inside of the neck of a bottle, having a circular bottom wall, an annular upstanding wall extending from said bottom wall, and adapted to receive and surround the neck of the bottle, said bottom wall being provided with an axial boss formed with a through opening, a stem extending into said opening and fixed to said bottom wall, and an annular glass cutter on said stem, and co-axial with said stem.

2. A device of the character described, having a circular bottom wall, an annular upstanding wall extending from said bottom wall, said bottom wall being provided with an axial boss formed with a through opening, a stem extending into said opening and fixed to said bottom wall, and a glass cutter on said stem, said cutter being co-axial with respect to said stem and disposed below the rim of the upstanding wall.

3. A device of the character described, having a bottom wall, an upwardly and outwardly inclined annular upstanding wall extending from said bottom wall, said bottom wall being provided with an axial boss formed with a central tapered opening, decreasing in diameter toward the bottom, a stem having a tapered portion extending into the tapered opening, the bottom end of said stem being riveted to said bottom wall, said stem having a collar contacting the upper rim edge of said boss, the upper end of said stem being formed with an axial screw threaded opening, a screw within said opening having a collar contacting the upper end of said stem, and a head spaced from said stem, and an annular glass cutter on said collar and between the upper end of said stem and the head of said screw.

4. A device of the character described, having a bottom wall, an upwardly and outwardly inclined annular upstanding wall extending from said bottom wall, said bottom wall being provided with an axial boss formed with a central tapered opening, decreasing in diameter toward the bottom, a stem having a tapered portion extending into the tapered opening, the bottom end of said stem being riveted to said bottom wall, said stem having a collar contacting the upper rim edge of said boss, the upper end of said stem being formed with an axial screw threaded opening, a screw within said opening having a collar contacting the upper end of said stem, and a head spaced from said stem, and an annular glass cutter on said collar and between the upper end of said stem and the head of said screw, said stem and screw being disposed below the upper rim edge of said upstanding wall.

5. A device for scoring the inside of the neck of a bottle comprising a base adapted to contact the mouth of the bottle, an annular wall on said base adapted to receive the neck of the bottle, a stem co-axial with the annular wall extending from said base in the same direction as the annular wall and fixed to said base and adapted to be received in the neck of the bottle, and a glass cutter on the stem co-axial with respect thereto, said annular wall being adapted to be grasped by the hand for turning said device to score the inside of the neck of the bottle.

6. A device for scoring the inside of the neck of a bottle comprising a base adapted to contact the mouth of the bottle, an annular wall on said base adapted to receive the neck of the bottle, a stem co-axial with the annular wall extending from said base in the same direction as the annular wall and fixed to said base and adapted to be received in the neck of the bottle, and a glass cutter on the stem co-axial with respect thereto, said annular wall being adapted to be grasped by the hand for turning said device to score the inside of the neck of the bottle, said annular wall tapering outwardly from the base.

7. A device for scoring the inside of the neck of a bottle comprising a base adapted to contact the mouth of the bottle, an annular wall on said base adapted to receive the neck of the bottle, a stem co-axial with the annular wall extending from said base in the same direction as the annular wall and fixed to said base and adapted to be received in the neck of the bottle, and a glass cutter on the stem co-axial with respect thereto, said annular wall being adapted to be grasped by the hand for turning said device to score the inside of the neck of the bottle, the cutter being disposed between the rim of the annular wall and said base.

ANDREW J. McGANN.